Aug. 22, 1933.　　　A. MOORHOUSE　　　1,923,225
MOTOR VEHICLE
Filed Feb. 5, 1931
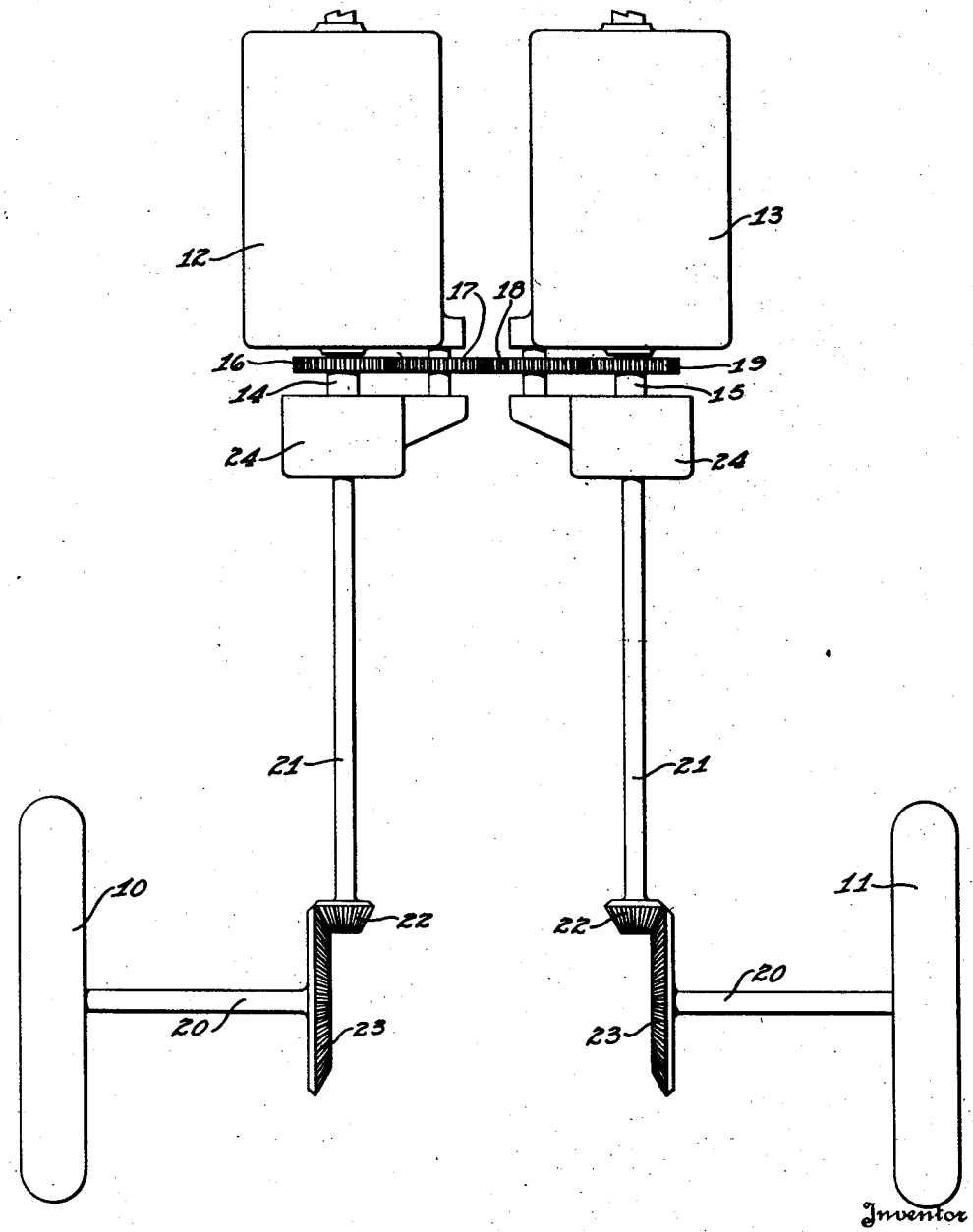
Inventor
ALFRED MOORHOUSE.
By
Attorney Patented Aug. 22, 1933

1,923,225

UNITED STATES PATENT OFFICE 1,923,225

MOTOR VEHICLE

Alfred Moorhouse, Detroit, Mich., assignor to Packard Motor Car Company, Detroit, Mich., a Corporation of Michigan Application February 5, 1931. Serial No. 513,604

4 Claims. (Cl. 180—54)

This invention relates to drive mechanisms and more particularly to power transmission mechanism for motor vehicles.

Motor vehicle drive mechanism usually includes change speed gearing and differential gearing. Both of such gearings are inherently noisy and add considerably to the cost of motor vehicles. The major portion of the vehicle control operation is taken up in shifting the change speed gearing. The initial cost, the noise and the manipulation resulting in the use of differential and change speed gearing are objectionable.

An object of my invention is to provide power transmitting mechanism for traction wheels which is quiet in operation and responsive to the engine control for its speed regulation.

Another object of the invention is to provide a motor vehicle in which the traction wheels are driven by independent mechanisms which include a torque converter of the type permitting some lost motion.

A further object of the invention is to provide a drive for the traction wheels of a motor vehicle which does not require differential or change speed gearing.

Other objects of the invention will appear from the following description taken in connection with the drawing, which forms a part of this specification.

In the drawing I have illustrated diagrammatically the traction wheels and the driving mechanism therefor.

Referring to the drawing by characters of reference, 10 and 11 represent the driven traction wheels of a motor vehicle which are adapted to be arranged on each side of the chassis (not shown).

A pair of internal combustion engines 12 and 13 provide the power plants for the traction wheels, and such engines are provided with crank shafts 14 and 15 respectively. The engines are arranged to turn the crank shafts in opposite directions relatively and the shafts are directly associated through gearing 16, 17, 18 and 19.

Driving mechanism extends between the crank shaft 14 and the traction wheel 10, and another independent driving mechanism extends between the engine 13 and the traction wheel 11. In each of such driving mechanisms there is a driven axle 20 and a propeller shaft 21. A bevel gear 22 is fixed upon each of the shafts 21 in a relation to mesh with a bevel gear 23 fixed upon the associated axle 20, such gearing being of a reduction character. Connecting each crank shaft and propeller shaft I arrange a torque transmitter 24 which is of a type permitting some lost motion and reversal, and as an example of one type of torque transmitter which can be utilized for this purpose, reference may be had to Patent No. 1,199,360 to Hermann Fottinger of September 26, 1916.

It will be understood that the driving mechanisms essentially require a source of power, and separate driving mechanisms leading from the source of power to the traction wheels which includes a torque transmitter of the type above described. The axle and shaft portion of the driving mechanisms are only one manner in which the power may be transmitted from the torque transmitters to the traction wheels, and conventional connections between the axles and wheels, and the axles and propeller shafts can be employed. The power must be transmitted to the traction wheels so that they are driven in the same direction by their driving mechanisms, and I have provided for this by arranging the engines so that they turn the crank shafts in opposite directions. It is also desirable to gear the engines together so that their control can be simplified and the same power transmitted to both torque transmitters.

With the mechanism described, there is no necessity for a differential or for change speed gearing. The traction wheels are driven at a speed controlled by the engine speed, and as the torque transmitters permit lost motion in the transmission of power to the propeller shafts, the traction wheels can rotate at different speeds when the vehicle is not running in a straight course. The propelling mechanism described is relatively quiet in that it has none of the noises inherent in change speed and differential gearing and it provides a simple and relatively inexpensive drive for the traction wheels.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In a motor vehicle, the combination of two parallel driving shafts positively geared together, two independently rotable traction wheels, and transmission mechanism connecting each shaft with one of said traction wheels, each said mechanism including a non-positive torque transmitter.

2. In a motor vehicle, the combination of a pair of power plants having parallel crank shafts, gearing for positively connecting said shafts to turn together, independently rotatable traction wheels, and separate driving mechanisms leading from the power plants to the separate wheels, each such driving mechanism including a torque transmitter permitting different speeds of rotation of the traction wheels.

3. In a motor vehicle, the combination of a pair of power plants, gearing connecting said power plants to cause them to rotate together without slip, independently rotatable traction wheels, driving mechanism from one of said plants to one of said wheels, and driving mechanism from the other of said plants to another of said wheels, each of said mechanisms including a torque transmitter of the type allowing slip, whereby the power plants will always rotate at the same speed while the traction wheels may rotate at relatively different speeds as when turning corners.

4. In a motor vehicle, the combination of two internal combustion engines arranged with their crank shafts in parallel, said two engines constituting the entire power plant of the vehicle, gearing for positively connecting said shafts to turn at the same speed, independently rotatable and co-axial traction wheels for said vehicle, and separate driving mechanism extending from the engine crank shafts to the separate traction wheels, each of such driving mechanism including a torque transmitter of the type allowing slip.

ALFRED MOORHOUSE.